Nov. 1, 1932.  A. LAUGHLIN, JR  1,885,924
METHOD AND APPARATUS FOR THE MANUFACTURE OF TUBES
Original Filed March 21, 1925  5 Sheets-Sheet 4
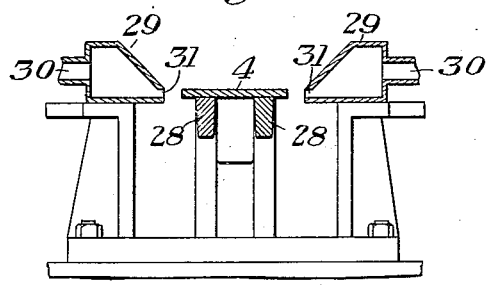
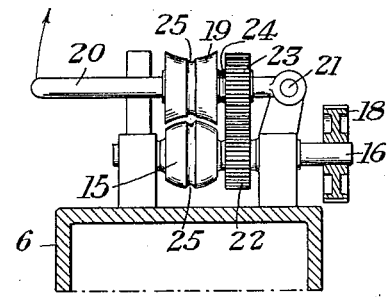
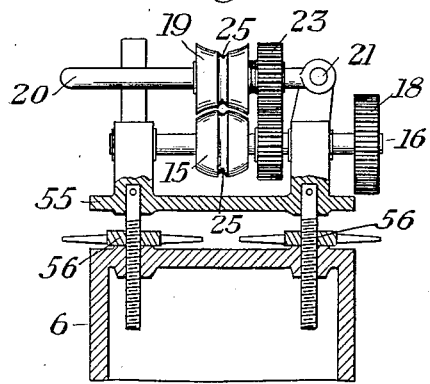
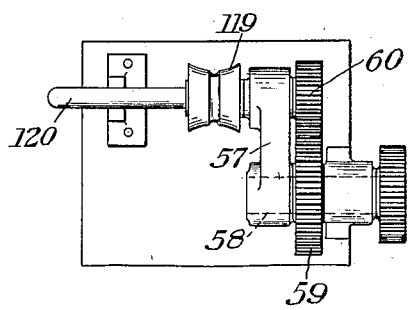
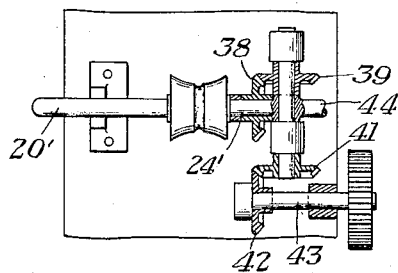
INVENTOR Nov. 1, 1932. A. LAUGHLIN, JR 1,885,924
METHOD AND APPARATUS FOR THE MANUFACTURE OF TUBES
Original Filed March 21, 1925 5 Sheets-Sheet 5
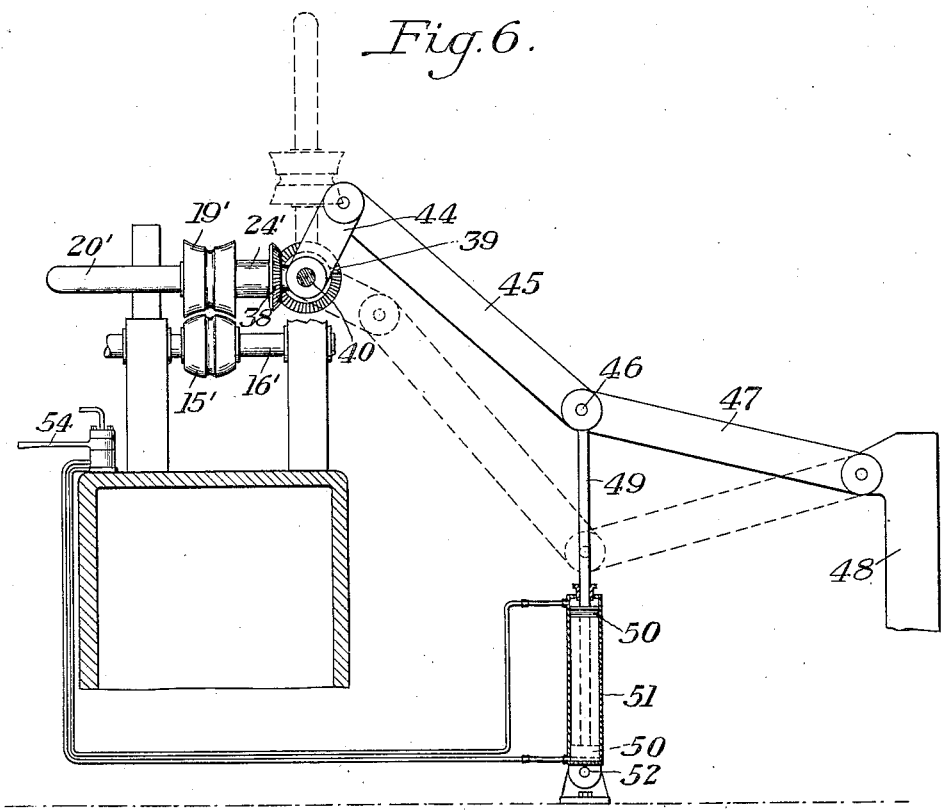
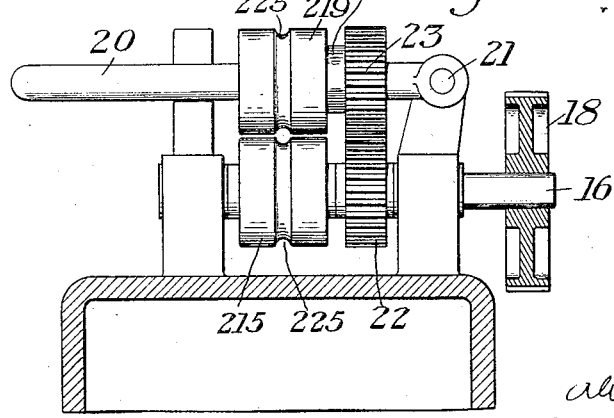
INVENTOR Patented Nov. 1, 1932

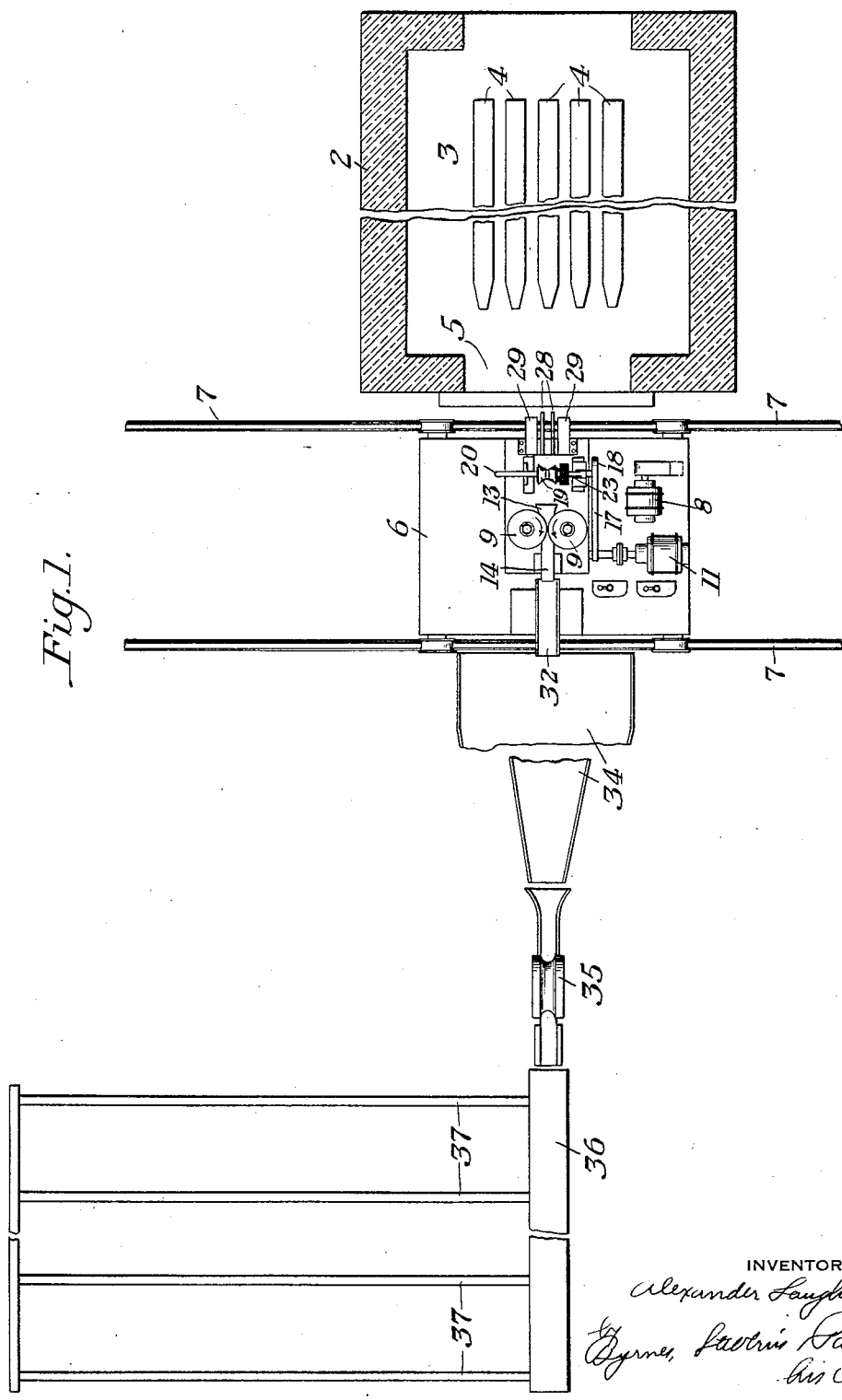

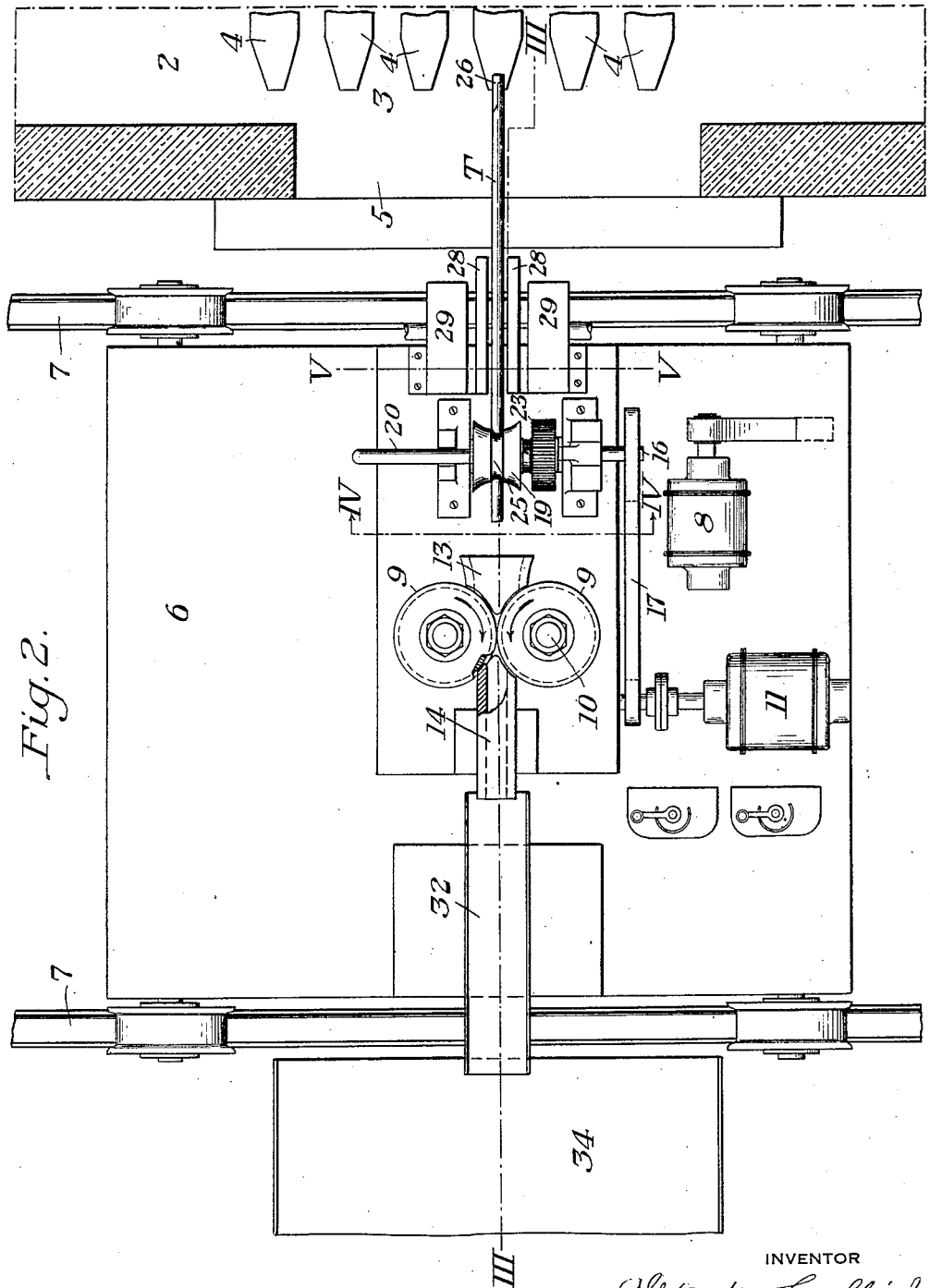

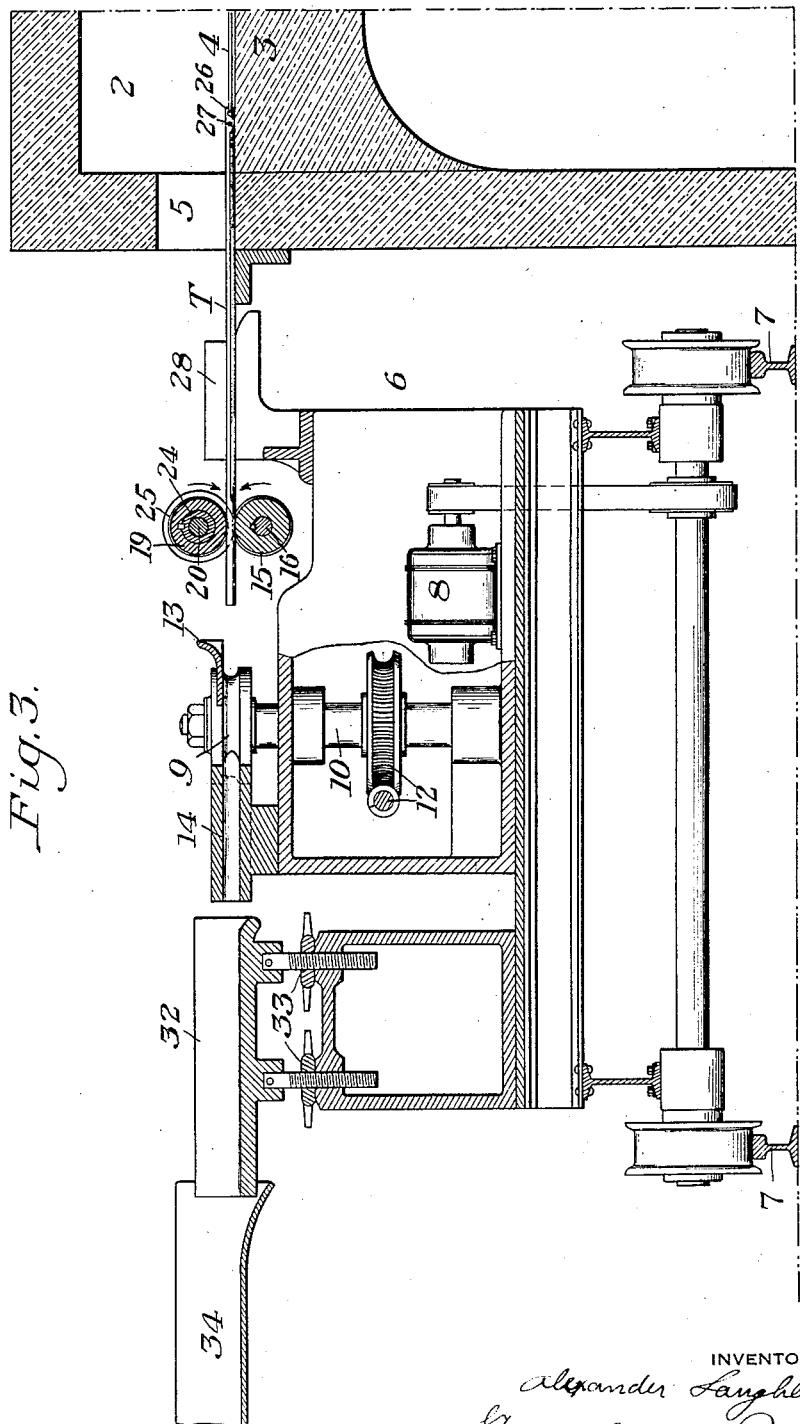

1,885,924

UNITED STATES PATENT OFFICE

ALEXANDER LAUGHLIN, JR., OF PITTSBURGH, PENNSYLVANIA; MARGARET M. LAUGHLIN AND THE UNION TRUST CO. OF PITTSBURGH, EXECUTORS OF THE ESTATE OF SAID ALEXANDER LAUGHLIN, JR., DECEASED, ASSIGNORS TO CENTRAL TUBE COMPANY, OF PITTSBURGH, PENNSYLVANIA, A CORPORATION OF PENNSYLVANIA

METHOD AND APPARATUS FOR THE MANUFACTURE OF TUBES

Application filed March 21, 1925, Serial No. 17,196. Renewed January 18, 1932.

The present invention relates particularly to the manufacture of tubes or pipe, and more especially to the manufacture of so-called buttwelded tubes, the term "tubes" being used throughout the specification and claims in its generic sense.

At present, the method most generally used in the manufacture of buttwelded tubes is to heat flat strips, or skelp, in a furnace, the ends of the skelp toward the welding means being partly pointed. These pointed ends are each in turn gripped by a pair of tongs, over the handles of which are passed bells, there being a bell for each pair of tongs. The handles of the tongs are then secured to a draw chain which successively draws the tongs and skelp gripped thereby through the bell shaped die previously passed over the tong handles, thus bending the skelp into circular contour and at the same time pressing the edges thereof together and forming a weld. In this method, the friction between the heated skelp and the bell creates a tension on that portion of the skelp which has already passed through the bell, thereby tending to stretch it. In practice, therefore, it is impossible to increase the pressure on the edges of the skelp as the pipe is formed by decreasing the size of the die, as the tension on the formed and welded pipe would thereby be increased to a point where it would elongate or break between the tong and the bell. This inability to provide sufficient pressure results, at times, in the production of sections of tubes which have not been subjected to sufficient pressure to effect a proper weld. Moreover, there is an increasing tendency for the bell to become burned as the hot skelp continues to pass therethrough, thereby minimizing the length of heated skelp which can be pulled through a bell at a single operation.

One of the purposes of my invention is to substitute for the die or bell a pair of grooved rolls through which the heated skelp is passed and formed into a round and welded tube. The advantages of this substitution should be evident, in that rotating welding and forming means in themselves eliminate the necessity of drawing the tube beyond such means, thereby eliminating a stretch on the tube, and accordingly making it possible to exert a greater pressure at the point where the heated edges of the skelp are brought together.

I am aware that it has heretofore been proposed in the art to which the present invention relates to utilize welding or forming rolls in lieu of the bells or dies which are in common use. This proposed use of rolls has, however, been impractical for the reason that no expeditious and feasible means has heretofore been provided for securing the entry of the heated skelp into the welding rolls.

In the manufacture of hot welded tubing, the skelp must be transferred into the welding means most expeditiously, as any delay in the transfer from the heated zone of the furnace to the welding means results in sufficient cooling of the skelp to prevent proper welding thereof.

My invention provides efficient and practical means for securing the necessary rapid movement of the skelp from the heated zone of the furnace to the wleding means, and at the same time may, and preferably does, provide a forming means between the furnace and the welding means which facilitates the entry of the skelp into the welding rolls. By means of my apparatus, I eliminate also the necessity for forming the entering end of the skelp prior to its being charged into the heating furnace, except that the end of each piece of skelp is preferably partially pointed and slightly formed, exactly in accordance with common practice now followed in the manufacture of buttwelded tubes.

In the accompanying drawings, there are shown for purposes of illustration only, certain preferred embodiments of the present invention, it being understood that the drawings do not define the limits of my invention as changes in the construction and operation disclosed therein may be made without departing either from the spirit of the invention or the scope of my broader claims.

In the drawings:

Figure 1 represents a small scale top plan view partially broken away and partially in section of the general arrangement of a tube manufacturing device embodying the present invention;

Figure 2 is a top plan view on a larger scale illustrating the welding apparatus located on a traveling bench in front of the furnace, the front end only of the skelp being shown in the furnace;

Figure 3 is a longitudinal sectional view along the line III—III of Figure 2;

Figure 4 is a transverse sectional view along the line IV—IV of Figure 2, looking in the direction of the arrows;

Figure 5 is a transverse sectional view along the line V—V of Figure 2, the section being taken to illustrate a piece of skelp in transverse section;

Figure 6 is a view, similar to Figure 4, illustrating a slightly modified embodiment of the invention;

Figure 7 is a view, similar to Figure 4, illustrating one form of adjustment that may be used with the mechanism illustrated in Figures 4, 5, and 6;

Figures 8 and 9 are views, similar to Figure 4, illustrating still other embodiments of the invention, and Figure 10 is a view, similar to Figures 4 to 9, both inclusive, showing another form of the invention in which the feeding means is not adapted to perform any forming operation on the skelp.

In carrying out the present invention there may be provided a heating furnace 2, having a hearth 3 adapted to support a number of strips or pieces of skelp 4. The furnace may be heated in any desired manner to bring the temperature of the skelp to the desired point for effecting welding of the edges, and is provided with a drawing opening 5 through which the heated skelp may be drawn and passed to a tube making means.

I have herein illustrated this tube making means as comprising a bench 6 traveling on tracks 7 transversely of the furnace, whereby it may be brought opposite successive pieces of skelp as each piece is to be drawn from the furnace. The bench may be provided with a motor 8 for driving the same as desired.

Mounted on the bench are forming and welding rolls 9 preferably mounted to rotate about vertical axes, whereby the division line between the rolls will be substantially in a vertical plane. This may conveniently be accomplished by providing vertically extending shafts 10, journaled in the bench, and adapted to be driven in any desired manner as by a motor 11 and suitable gearing 12. The gearing should be such that the two rolls have their adjacent faces traveling in the same direction to thereby facilitate the feed of skelp and tube therebetween, the direction of rotation being clearly indicated by the arrows in Figures 1 and 2.

In advance of the rolls so as to be effective intermediate the rolls and the furnace, is a top guide 13, while immediately beyond the rolls is a delivery guide 14 for the formed tube.

While experiments have shown the desirability of rolls of the general character described, for the production of tubes, their use involves a considerable problem in the proper and expeditious transfer of the heated skelp from the furnace into the pass between the rolls. In the present embodiment of my invention I have illustrated feeding means for this purpose, conveniently comprising a lower roll 15, preferably of convex contour transversely thereof, as clearly shown in Figure 4. The roll is mounted on a horizontally extending shaft 16 adapted to be driven in any desired manner, as, for example, by the motor 11 through a belt or sprocket chain 17, the shaft 16 being provided with a suitable pulley or wheel 18 for this purpose. Cooperating with the roll 15 is a super-imposed roll 19, preferably having a concave contour transversely thereof, as clearly shown in Figure 4. This roll is carried by an arm 20 adapted to be swung about a horizontally effective pivotal mounting 21, permitting the arm to be swung in the direction indicated. The roll 19 may either be an idle roll or a driven roll, the latter, however, being preferred. For effecting the desired rotation of the roll 19, the shaft 16 may have secured thereto a gear 22 adapted to mesh with a similar gear 23 secured to a suitable sleeve 24 on the arm 20, this sleeve 24 also carrying the concave roll 19. With this construction, it will be apparent that with the parts in the position indicated in Figure 4, both of the rolls will be driven, the direction of rotation being as indicated by the arrows in Figure 3.

The rolls 15 and 19 are each preferably formed with a peripherally extending groove 25. These grooves are adapted to form a path of approximately circular cross section, and of a size suitable for the reception of tongs T. In accordance with established practice at the present time, tongs of this nature are utilized for gripping the front end of the hot skelp within the furnace. This practice has proven itself to be exceptionally desirable and expeditious, but has heretofore not been adaptable for use with forming and welding rolls, and the use of such rolls has therefore not been considered entirely practical. By my invention this difficulty is entirely overcome.

As well understood in the art, the tongs are conveniently of a construction embodying relatively short gripping jaws 26 formed by providing the pivotal connection 27 for the handles adjacent one end. The handles in turn are twisted intermediate their length, as clearly indicated in Figure 3, whereby after a piece of skelp has been gripped between the jaws, the handles may be effectively inter-engaged or inter-locked to prevent release of the skelp.

In the operation of my invention, pieces of skelp of any desired length, but preferably in multiples of commercial pipe lengths, are placed side by side in the furnace. The traveling bench is then placed at a position in front of the furnace so that the combined feeding and bending rolls and the combined forming and welding rolls are in line with the piece of skelp to be formed into a tube. The arm 20 is thrown upwardly to thereby swing the roll 19 to inoperative position permitting easy access to the roll 15. Substantially at the same time, tongs are engaged with the pointed end of the piece of skelp next to be drawn from the furnace, and the handles inter-engaged as before pointed out. Thereafter, the tong handles are dropped onto the lower roll 15 with the handles in the peripherally extending groove 25. With the tongs in this position, the arm 20 is swung downwardly to bring the upper pinch or feeding roll 19 into the position illustrated in Figure 4, to thereby grip the tong handles and effect feeding thereof toward the left, as viewed in Figures 1 to 3, both inclusive, the rolls being positively driven for this purpose. The peripheral grooves 25 not only accommodate the tong handles, but also serve to effectively grip the same as required to obtain the desired feeding action.

It will be apparent to those skilled in the art that as the heated skelp enters the path between the feeding rolls, it will be preliminarily bent into inverted U-shape by the action of these rolls, due to the transverse contour thereof. This preliminary shaping operation is not essential, but where used it prepares the skelp for the action of the forming and welding rolls 9.

After leaving the forming rolls, the tongs will pass under the top guide 13, into the pass between the rolls 9, and thence through the delivery guide 14, the skelp moving therewith. As the preliminarily shaped skelp enters the rolls 9, the edges are further bent downwardly and inwardly and brought together with sufficient pressure to initiate and complete the weld. This downward bending action of the skelp is highly desirable as opposed to an upward bending of the skelp edges, for the reason that it permits scale to freely fall from the skelp as it is released by the bending operation. It will be apparent to those skilled in the art that the pass between the rolls 9 will be determined by the size of the tube it is desired to form.

The traveling bench, after the complete passage of a piece of skelp as before described, is then moved opposite the next adjacent piece of skelp on the furnace hearth, and the operation is repeated successively, a piece of cold skelp being charged into the furnace from the oposite end as each heated piece is withdrawn by the welding apparatus.

In order to produce a perfect weld it is obvious that the heated edges of the skelp must be brought together with considerable pressure. This pressure in turn is effective, where welding rolls are used, for gripping the skelp and feeding the same entirely by this gripping action. It therefore becomes unnecessary in accordance with this invention to provide any drawing chain, or to subject the already formed portions of a tube to a drawing or stretching action. This constitutes an important advantage in the use of rolls over the common practice of using bells or dies. Furthermore, it enables the use of a pressure between the rolls of the order required to insure a perfect weld, the amount of pressure not being limited as it necessarily is where bells or dies are utilized.

In some cases I have found it desirable to increase the temperature of the edges of the skelp after it leaves the furnace, to better condition the same for the welding operation. For this purpose I may provide guides 28 intermediate the rolls 15 and 19 and the furnace, the guides preferably being spaced to accommodate the passage of the tongs therebetween. Laterally positioned outside of the guides are blast boxes 29, illustrated in detail in Figure 5. Each of these boxes may have an inlet 30 and an outlet 31. Preferably the outlets are in the form of elongated slots disposed substantially in the plane of the skelp as it rests on the guides 28. Fluid may be supplied to the boxes 29 of a nature adapted to direct a super-heating blast of gas against the hot edges of the skelp to thereby effect a rise in the temperature of the edges. This super-heating of the edges is not essential to the operation of my improved welding means herein disclosed, but it is illustrated to indicate the possibility of its use if desired.

As a formed tube emerges from the delivery guide 14, it passes over a support 32, having means 33 for effecting vertical adjustment thereof. This support in turn delivers to a table 34, having its edges gradually converging away from the traveling bench, to divert the tube into size rolls 35 which may be positively driven to thereby also serve as feeding means for the successive tubes. These size rolls deliver to a roll-off plate 36, adapted to discharge tubes laterally onto the cooling racks 37, as customary in the art.

In Figures 6 and 7 there is illustrated a slightly modified embodiment of the invention, in which parts corresponding to parts already described are designated by the same reference characters having a prime affixed thereto. In accordance with this embodiment, the sleeve 24' on the shaft 20' may be driven by a bevel gear 38 meshing with a similar gear 39 on the stub shaft 40. This stub shaft may in turn be driven by a bevel gear 41 meshing with a similar gear 42 on the power shaft 43 adapted to be driven in any desired manner. The lower shaft 16' may be driven as before described, or may be an idle shaft.

Secured to the stub shaft 40 is a crank 44, to the upper end of which is pivotally connected one end of a link 45, the opposite end of which is in turn provided with a pivotal connection 46 to a link 47 pivotally connected to a fixed support 48. Operatively attached to the pivotal connection 46 is a piston rod 49 having a piston 50 operable in a cylinder 51. This cylinder may have a pivotal mounting 52 to permit swinging movement as required during travel of the piston from the full line position of Figure 6 to the dotted line position of this figure. Such travel will be effective for swinging the roll 19' to the inoperative dotted line position shown, whereby the tong handles may be readily dropped into position.

Any convenient means of mechanically moving the roll 19' may be utilized. Where it is in the form of a cylinder, the movement or travel of the piston may be controlled by a valve having an operating handle 54 accessibly positioned, and adapted upon movement in one direction to direct fluid under pressure into one end of the cylinder, and upon movement in the opposite direction to direct fluid under pressure into the other end of the cylinder. By such a construction, the upper pinch roll may be rapidly and mechanically thrown into and out of operative position.

In Figure 8 there is illustrated the same type of pinch roll as shown in Figure 4, the rolls, however, being carried by a plate 55 mounted on adjusting means 56 similar to the means 33 for the support 32. Such adjusting means enables vertical positioning of the rolls to be very accurately controlled.

Figure 9 illustrates another form of the invention in which the upper roll 119 is secured to a shaft 120 journaled in the arm 57 carried by the shaft 58. The shaft 58 may be driven as desired, and carries a gear 59 meshing with a gear 60 on the shaft 120. With this construction, the roll 119 moves to inoperative position about the center of the shaft 58 as an axis.

It has been before stated that the pinch rolls need not effect any preliminary shaping of the skelp. In Figure 10 there is shown a construction in which this shaping does not take place, the rolls 215 and 219 each having a substantially flat transverse surface interrupted only by the peripherally extending grooves 225.

Certain advantages of the present invention arise from the provision of a tube forming apparatus employing welding rolls with means whereby tongs of usual construction may be utilized for initiating the feed of the skelp between the rolls.

Still other advantages of the present invention arise from the provision of a construction making the use of welding rolls entirely practicable for the formation of comparatively short lengths of skelp into tubes. This enables skelp of commercial dimensions to be used in combination with welding rolls, whereby the advantages of the improved efficiency of the rolls is obtained.

I claim:

1. Forming means for the manufacture of tubing, comprising a pair of forming rolls, guiding means cooperating therewith, pinch rolls for feeding a heated strip through said guiding means and into the path between said rolls, and tongs for said heated strip, said pinch rolls having one portion shaped to engage and permit the passage therebetween of said pair of tongs and another portion shaped for cooperation with said strip.

2. Feeding means for tube forming apparatus, comprising a positively driven pinch roll, a movable pinch roll cooperating therewith and adapted to be moved into and out of cooperative gripping relation with said first-mentioned roll, said rolls having a portion of one shape to guide and permit the passage therebetween of a pair of tongs and another portion of another shape to permit the passage of a piece of skelp.

3. Apparatus for the manufacture of tubing, comprising a furnace, a forming means, pinch rolls intermediate the furnace and forming means and adapted to initially shape a piece of skelp, and tongs for said skelp, said pinch rolls having a portion of one shape to guide and permit the passage therebetween of said pair of tongs and another portion of another shape for the skelp.

4. Apparatus for the manufacture of tubing, comprising a furnace, welding rolls, tongs, and feeding means intermediate the furnace and welding rolls, said feeding means being shaped for engaging and feeding a pair of tongs with an attached piece of skelp to the welding rolls, said feeding means having portions of one shape for the tongs and portions of another shape for the skelp.

5. Feeding means for tube manufacturing apparatus, comprising tongs, a pair of rolls having cooperating peripherally extending grooves of one shape adapted to engage and permit the passage of a pair of tongs therebetween and having other portions of another shape adapted to permit the passage of a piece of skelp engaged by said tongs.

6. Feeding means for tube manufacturing apparatus, comprising tongs, and a pair of rolls having portions of one shape to engage a pair of tongs and feed the same between the rolls, said rolls having portions of another shape adapted to bend a piece of skelp into inverted U-shape.

In testimony whereof I have hereunto set my hand.

ALEXANDER LAUGHLIN, Jr.